US007145463B2

(12) United States Patent
Olsen

(10) Patent No.: US 7,145,463 B2
(45) Date of Patent: Dec. 5, 2006

(54) SYSTEM AND METHODS FOR PROVIDING AUTOMATIC ADJUSTMENT OF OPERATING SETPOINTS FOR A MONITORING DEVICE

(76) Inventor: Donald Olsen, 11 Larkspur Dr., Smithtown, NY (US) 11787

( * ) Notice: Subject to any disclaimer, the term of this patent is extended or adjusted under 35 U.S.C. 154(b) by 140 days.

(21) Appl. No.: 10/935,664

(22) Filed: Sep. 7, 2004

(65) Prior Publication Data
US 2005/0062600 A1 Mar. 24, 2005

Related U.S. Application Data

(60) Provisional application No. 60/500,612, filed on Sep. 5, 2003.

(51) Int. Cl.
*G08B 17/00* (2006.01)
(52) U.S. Cl. .................. 340/585; 340/588; 62/126; 62/129; 374/132
(58) Field of Classification Search ............... 340/585, 340/584, 588, 691.6, 692; 62/125, 126, 129; 374/132
See application file for complete search history.

(56) References Cited

U.S. PATENT DOCUMENTS

| 4,482,785 | A | * | 11/1984 | Finnegan et al. ......... 379/22.03 |
| 5,262,758 | A | * | 11/1993 | Nam et al. .................. 340/588 |
| 6,158,227 | A | * | 12/2000 | Seeley ........................... 62/56 |
| 6,471,398 | B1 | * | 10/2002 | Ukai .......................... 374/169 |

* cited by examiner

*Primary Examiner*—Toan N. Pham
(74) *Attorney, Agent, or Firm*—Gerald T. Bodner

(57) ABSTRACT

A method for providing an electronic monitoring device with the ability to detect the status of a controlled condition of a monitored environment, and, based on this status, to automatically self-adjust monitoring parameters in accordance with pre-defined parameter settings so as to properly monitor the controlled condition of the monitored environment. The monitoring device includes a microcontroller, a sensor to detect the status of the controlled condition of the monitored environment, switches to allow for user interaction and audible and visual annunciation devices as well as remote annunciation devices such as relays, all of these devices combined in a system to alert personnel when controlled conditions are abnormal.

30 Claims, 6 Drawing Sheets

SYSTEM AND METHODS FOR PROVIDING AUTOMATIC ADJUSTMENT OF OPERATING SETPOINTS FOR A MONITORING DEVICE

CROSS-REFERENCE TO RELATED APPLICATIONS

This application is related to U.S. Provisional Patent Application Ser. No. 60/500,612, filed on Sep. 5, 2003, and entitled "System and Methods for Providing Automatic Adjustment of Operating Set-Points for a Monitoring Device". This application claims the benefit of priority under 35 U.S.C. §119 to the aforementioned related provisional patent application. This application also incorporates by reference in its entirety the aforementioned related provisional patent application.

COPYRIGHT NOTICE

A portion of the disclosure of this patent document contains material which is subject to copyright protection. The copyright owner has no objection to the facsimile by anyone of the patent disclosure, as it appears in the Patent and Trademark Office patent files or records but otherwise reserves all copyright rights whatsoever.

FIELD OF THE INVENTION

The present invention relates to devices designed for the monitoring of controlled conditions of environments where the maintenance of these controlled conditions within certain defined parameters is essential for proper operation. The method described herein may be used in the monitoring of variables such as temperature, pressure, humidity and the like, assuming that the following conditions exist: the monitoring device is independent of the controlling device of the monitored environment, and the monitored environment has more than one controlled condition under which it may operate that would be considered "normal". A controlled environment that would meet these criteria would be refrigerated compartments, of which there are typically two standard types. One type is commonly referred to as a cooler, also known as a refrigerator, and the other type is commonly referred to as a freezer, and these types of environments would be the primary application for the invention.

Specifically, the present invention relates to a device, commonly known as a temperature alarm, which incorporates a sensor to detect the temperature of a monitored environment, an audible annunciation device such as a piezo buzzer to provide audible alarm annunciation, visual annunciation devices such as LED's or digital readouts to provide visual alarm annunciation, switches to allow for user interaction with the monitoring device, and a circuit which, in the preferred embodiment, incorporates a microcontroller, the microcontroller containing code which, in addition to making the device function as a temperature alarm, contains specific algorithms which enable the device to detect, from the monitored temperature, whether the controlled environment is a cooler or a freezer and to automatically adjust the cooler or freezer operating parameters in accordance with the temperature so as to properly monitor the controlled environment.

BACKGROUND OF THE INVENTION

In the storage of perishable items such as food, there are typically two types of environments which are most frequently utilized, namely, coolers and freezers. This is true for refrigeration systems in the home which incorporate a cooler section and a freezer section as separate compartments of the refrigerator, and it is also true for commercial and scientific refrigeration, which will typically utilize compartments such as reach-in coolers and freezers and walk-in coolers and freezers for storage of perishables. Oftentimes, systems such as reach-in coolers and freezers will incorporate refrigeration, control and monitoring systems which are specific to the compartment being operated and monitored, as the compartment is self-contained and its function is clearly defined by its design. However, walk-in coolers and freezers are not so clearly defined, as they may vary greatly, depending on the size, the configuration and the intent of the refrigerated compartment. As a result, walk-in refrigerators and freezers often utilize separate and independent monitoring devices, also known as temperature alarms, as a means of protecting the perishables contained therein in the event of a refrigeration malfunction or failure or in the event of user negligence. Temperature alarms may also be utilized on reach-in compartments that do not provide self-contained monitoring systems for the same purpose.

The design and operation of temperature alarms are fairly standardized and well documented. The typical temperature alarm will utilize a mechanical device such as a thermostat or an electronic device such as a thermistor to sense the temperature of the monitored compartment. It will also provide a method for establishing a temperature limit, also referred to as a setpoint, which the temperature in the compartment should not exceed for a prolonged period of time if the compartment is operating normally. Most frequently, the setpoint will be a high limit, as the most common concern is with perishables spoiling due to refrigeration malfunction because the compartment is too warm. However, a means of establishing a low temperature setpoint as well is often provided to protect against conditions such as freezing of product in a cooler if the temperature gets too cold. Another capability commonly found in temperature alarms is the provision of a time delay. This time delay may be mechanical or electronic in its design and it may be fixed or variable in its delay time. The purpose of the time delay is to override normal rises in compartment temperature that would occur as a result of normal usage. One such normal usage would be doors being left open for a period of time, particularly for loading and unloading of a compartment. Another cause for normal rises in compartment temperature would be a refrigeration system function known as a defrost cycle. Defrost cycles are typically timed occurrences which occur at regular intervals, as dictated by a timer which is integrated into the refrigeration control system.

In a typical defrost cycle, refrigeration is temporarily turned off, while simultaneously, heating elements, placed on the evaporator coil inside of the refrigeration compartment, are turned on. The purpose of the defrost cycle is to melt any ice that may have accumulated on the evaporator coil in the run time since the prior defrost cycle had occurred. This in an important function, as accumulated ice can block the flow of air through the refrigeration coils inside of the evaporator coil, thus affecting the efficiency and performance of the refrigeration system. In a temperature alarm, the interaction of the setpoint and time delay is as follows: Setpoints and a time delay appropriate to the operation of the refrigerator or freezer are manually selected.

If the compartment temperature reaches or exceeds a selected setpoint indicating possible abnormal operation, the selected time delay is initiated. If the monitored temperature returns to the safe range before the time delay expires, then the timer is shut off and is reset and no alarm condition is annunciated. This is typically what happens when either of the above described normal operational conditions occurs. If, however, due to negligence or due to an actual malfunction, the temperature exceeds the setpoint for the length of the time delay or longer, then an alarm condition is annunciated so as to alert personnel to the fact that perishables may be in danger of damage or spoilage. This annunciation is typically in the form of a buzzer such as a piezo type device, as well as LED's (light emitting diodes) or other lighting devices or displays which are incorporated into the temperature alarm for this purpose. Oftentimes, a relay or other means of generating a signal is also incorporated into a temperature alarm for the purpose of remote notification of a problem when a facility is unmanned. Temperature alarms, particularly if they are electronic, may also provide a digital readout which will be utilized to display compartment temperatures and other operational parameters. Finally, temperature alarms will also typically provide devices such as reset switches so that a user can respond to an alarm condition.

As mentioned in the prior description regarding setting up of the temperature alarm for a given application, it is stated that setpoints are normally manually selected so that they are correct in accordance with the application, and this represents a shortcoming for the following reasons: It frequently occurs, particularly in new construction and installations, where refrigeration equipment such as walk-ins, and monitoring systems such as temperature alarms, are installed before AC power is available in a given facility. Lack of power makes it impossible to manually adjust operating parameters of the monitoring devices, and when power does become available, the personnel who installed these devices and would have performed these adjustments are often no longer present. The outcome of this scenario is that proper adjustment of the alarms is often overlooked, and they are, therefore, not set up for the application when power is turned on. The result of this shortcoming is often false alarms, which frequently require costly service calls to address and correct the problem, or the even more detrimental outcome of an actual loss of perishables, due either to user negligence such as leaving a door open or due to an actual refrigeration malfunction, because the monitoring system has not been set up properly. Another common problem is that installation instructions are often misplaced, or installing personnel do not want to take the time to read them. Again, the same result is produced with the same consequences.

It is, therefore, desirable to have a monitoring system which, when powered up, has firstly, the capability of detecting the nature of the compartment that is being monitored as to whether it is a cooler or a freezer, and has secondly, the capability of either maintaining its operating parameters or changing its operating parameters, depending on the nature of the monitored environment, both parameter choices from pre-programmed parameter settings, so that the monitoring device is automatically self-adjusting for the application.

OBJECTS AND SUMMARY OF THE INVENTION

Accordingly, it is an object of the present invention to provide a method for automatically detecting whether a controlled environment is a cooler or a freezer.

It is another object of the invention to sense and utilize the temperature of the controlled environment as a means of determining if the environment is a cooler or a freezer.

It is still another object of the invention to provide an environment monitoring system having a certain temperature setpoint, referred to as the transition temperature setpoint, as a means of differentiating, from the temperature of the controlled environment, between whether the controlled environment is a cooler or a freezer.

It is yet another object of the invention to provide and store at least two sets of pre-programmed temperature alarm setpoints, one set of high and low temperature alarm setpoints for a cooler and one set of high and low temperature alarm setpoints for a freezer, as a means of properly monitoring a controlled environment once the nature of the controlled environment has been determined from the temperature within the controlled environment in accordance with the transition temperature setpoint.

It is a further object of the invention to provide a means for utilizing the pre-programmed high and low temperature alarm setpoints for a cooler as the monitoring parameters if the monitored temperature of the controlled environment is above the transition temperature setpoint.

It is still a further object of the invention to provide a means for maintaining the pre-programmed high and low temperature alarm setpoints for a cooler as the monitoring parameters if the monitored temperature of the controlled environment is above the transition temperature setpoint and power has been interrupted and restored.

It is still another object of the invention to provide a means for utilizing the pre-programmed high and low temperature alarm setpoints for a freezer as the monitoring parameters if the monitored temperature of the controlled environment is or has ever been equal to or below the transition temperature setpoint.

It is yet another object of the invention to provide a means for maintaining the pre-programmed high and low temperature alarm setpoints for a freezer as the monitoring parameters if the monitored temperature of the controlled environment is or has ever been equal to or below the transition temperature setpoint and power has been interrupted and restored.

It is a further object of the invention to provide a means for differentiating between a connected temperature sensor condition where the temperature in a controlled environment is equal to or below the transition temperature setpoint and a disconnected temperature sensor condition so that disconnecting a temperature sensor in a controlled environment that is above the transition temperature setpoint does not cause the pre-programmed high and low temperature alarm setpoints for a cooler to change to the pre-programmed high and low temperature setpoints for a freezer.

It is yet a further object of the invention to provide a separate means for manually de-activating the ability of the environment monitoring system to automatically detect whether the controlled environment is a cooler or a freezer.

It is still another object of the invention to provide a separate means for manually activating or re-activating the ability of the environment monitoring system to automatically detect whether the controlled environment is a cooler or a freezer.

All of the above objectives are incorporated into the invention and will function in a manner as determined by the software and/or circuit design and in accordance with settings of user adjusted parameters as described in the detailed description of the preferred embodiments.

The present invention, therefore, provides a method for a temperature alarm to have the capability of detecting the temperature in a controlled environment, and, based on this temperature, to determine whether the controlled environment is a cooler or a freezer by comparing the temperature of the controlled environment to the transition temperature setpoint. Based on this comparison, and based on pre-programmed high and low temperature alarm setpoints for a cooler and on pre-programmed high and low temperature alarm setpoints for a freezer, the temperature alarm will automatically maintain the pre-programmed high and low temperature alarm setpoints for a cooler as its operating parameters if the temperature is above the transition temperature setpoint or equal to or above the transition temperature setpoint, and the temperature alarm will automatically change to the pre-programmed high and low temperature alarm setpoints for a freezer as its operating parameters if the temperature is equal to or below the transition temperature setpoint, or below the transition temperature setpoint.

The present invention further provides the temperature alarm with the ability to maintain, once automatically changed as previously described, the pre-programmed high and low temperature alarm setpoints for a freezer as the monitoring parameters if the monitored temperature of the controlled environment is ever above, or equal to or above, the transition temperature setpoint. Thus, the change in the selected setpoints that occurs when the temperature in the controlled environment is equal to or below, or at least below, the transition temperature setpoint is preferably not reversible in the course of performing normal monitoring functions, regardless of how warm the temperature in the controlled environment may become.

The present invention further provides the temperature alarm with the ability to differentiate between the drop in the sensed temperature in the controlled environment that would occur if the controlled environment were a freezer, and the drop in the sensed temperature that would occur if the temperature sensor were disconnected. In the preferred embodiment, a shorted temperature sensor wire would result in an off-scale high temperature reading and an open temperature sensor wire would result in an off-scale low temperature reading. Thus, if the temperature of the controlled environment is indicative of cooler operation and the sensor is accidentally or intentionally disconnected, a means is provided for differentiating a disconnected sensor condition from a normal operational condition whereby the temperature in the controlled environment drops to a point where it is equal to or below, or at least below, the transition temperature setpoint so that the temperature alarm does not automatically change its operating parameters to the pre-programmed high and low temperature alarm setpoints for a freezer when such an event occurs.

The present invention further provides firstly, a separate means for activating or re-activating the ability to automatically detect whether the controlled environment is a cooler or a freezer (hereinafter referred to as the autoset function), and provides secondly, a separate means for de-activating the autoset function so that high and low temperature alarm setpoints can be manually selected.

In a first embodiment of a method of the present invention, the invention is directed to a method of automatically associating one set of at least two sets of temperature alarm setpoints with means for providing a temperature controlled environment. The at least two sets of temperature alarm setpoints include a first set having a high temperature alarm setpoint and a low temperature alarm setpoint, and a second set having a high temperature alarm setpoint and a low temperature alarm setpoint. The high temperature alarm setpoint of the first set is greater than the high temperature alarm setpoint of the second set, and the low temperature alarm setpoint of the first set is greater than the low temperature alarm setpoint of the second set. The method comprises the steps of: sensing the temperature of the temperature controlled environment to generate a sensed temperature; comparing the sensed temperature of the temperature controlled environment with a transition temperature setpoint; and associating the first set of temperature alarm setpoints with the means for providing a temperature controlled environment when the sensed temperature of the controlled environment is one of at least equal to and greater than the transition temperature setpoint. The method can further comprise the steps of: pre-associating the first set of temperature alarm setpoints with the means for providing a temperature controlled environment prior to comparing the sensed temperature of the temperature controlled environment with the transition temperature setpoint to provide a pre-association therewith; and maintaining the pre-association of the first set of temperature alarm setpoints with the means for providing a temperature controlled environment when the sensed temperature of the temperature controlled environment is one of at least equal to and greater than the transition temperature setpoint. Furthermore, the method can further comprise the steps of: pre-associating the first set of temperature alarm setpoints with the means for providing a temperature controlled environment prior to comparing the sensed temperature of the controlled environment with the transition temperature setpoint to provide a pre-association therewith; and maintaining the pre-association of the first set of temperature alarm setpoints with the means for providing a temperature controlled environment when the sensed temperature of the temperature controlled environment is one of at least equal to and greater than the transition temperature setpoint; disassociating the first set of temperature alarm setpoints with the means for providing a temperature controlled environment when the sensed temperature of the temperature controlled environment is one of less than and at most equal to the transition temperature setpoint; and associating the second set of temperature alarm setpoints with the means for providing a temperature controlled environment when the sensed temperature of the controlled environment is one of less than and at most equal to the transition temperature setpoint.

In a second embodiment of a method of the present invention, the invention is directed to a method of automatically selecting temperature alarm setpoints for at least one of a cooler and a freezer, the at least one of the cooler and the freezer providing a temperature controlled environment. The method comprises the steps of: storing in memory at least two sets of temperature alarm setpoints, the at least two sets of temperature alarm setpoints including a first set of high and low temperature alarm setpoints for a cooler, and a second set of high and low temperature alarm setpoints for a freezer; storing in memory a transition temperature setpoint; sensing the temperature of the temperature controlled environment provided by the at least one of the cooler and the freezer thereby generating a sensed temperature; comparing the sensed temperature of the temperature controlled environment with the transition temperature setpoint stored in memory; selecting the first set of temperature alarm setpoints for a cooler when the sensed temperature of the temperature controlled environment is one of at least equal to and greater than the transition temperature setpoint stored in memory; and selecting the second set of temperature alarm setpoints for a freezer when the sensed temperature of the temperature controlled environment is one of less than and at most equal to the transition temperature setpoint stored in memory. The method can further comprise the steps of: pre-selecting the first set of temperature alarm setpoints for a cooler prior to comparing the sensed temperature of the temperature controlled environment with the transition temperature setpoint stored in memory to provide a pre-selection therefor; and maintaining the pre-selection of the first set of temperature alarm setpoints for a cooler when the sensed temperature of the temperature controlled environment is one of at least equal to and greater than the transition temperature setpoint stored in memory. In addition, the method can further comprise the steps of: pre-selecting the first set of temperature alarm setpoints for a cooler prior to comparing the sensed temperature of the temperature controlled environment with the transition temperature setpoint stored in memory to provide a pre-selection therefor; maintaining the pre-selection of the first set of temperature alarm setpoints for a cooler when the sensed temperature of the temperature controlled environment is one of at least equal to and greater than the transition temperature setpoint stored in memory; unselecting the first set of temperature alarm setpoints for a cooler when the sensed temperature of the temperature controlled environment is one of less than and at most equal to the transition temperature setpoint stored in memory; and selecting the second set of temperature alarm setpoints for a freezer when the sensed temperature of the temperature controlled environment is one of less than and at most equal to the transition temperature stored in memory.

In a third embodiment of a method of the present invention, the invention is directed to a method of automatically selecting temperature alarm setpoints for at least one of a cooler and a freezer, the at least one of the cooler and the freezer providing a temperature controlled environment. The method comprises the steps of: transferring into a working memory high and low temperature alarm setpoints for the cooler stored in an electrically erasable memory; sensing the temperature of the temperature controlled environment provided by the at least one of the cooler and the freezer thereby generating a sensed temperature; transferring into the working memory a transition temperature setpoint from a program memory; comparing the sensed temperature of the temperature controlled environment with the transition temperature setpoint. The steps include if, in response to the comparing step the sensed temperature of the temperature controlled environment is one of at least equal to and greater than the transition temperature setpoint, then maintaining in the working memory the high and low temperature alarm setpoints for the cooler; and if, in response to the comparing step the sensed temperature of the temperature controlled environment is one of less than and at most equal to the transition temperature setpoint, then transferring the working memory high and low temperature alarm setpoints for the freezer from the electrically erasable memory and overwriting the high and low temperature alarm setpoints for the cooler with the high and low temperature alarm setpoints for the freezer. The method can further comprise the step of: after the conditional step of overwriting the high and low temperature alarm setpoints for the cooler with the high and low temperature alarm setpoints for the freezer, maintaining the selection of the temperature alarm setpoints for the freezer if the sensed temperature of the temperature controlled environment is one of at least equal to and greater than the transition temperature setpoint.

In a fourth embodiment of a method of the present invention, the invention is directed to a method of automatically associating one of at least two temperature alarm setpoints with means for providing a temperature controlled environment. The method comprises the steps of: sensing the temperature of the temperature controlled environment to generate a sensed temperature; comparing the sensed temperature of the temperature controlled environment with a transition temperature setpoint; and associating one of the at least two temperature alarm setpoints with the means for providing a temperature controlled environment when the sensed temperature of the controlled environment is one of at least equal to and greater than the transition temperature setpoint.

In a fifth embodiment of a method of the present invention, the invention is directed to a method of automatically associating one of at least a first temperature alarm setpoint and a second temperature alarm setpoint with means for providing a temperature controlled environment. The method comprises the steps of: sensing the temperature of the temperature controlled environment to generate a sensed temperature; comparing the sensed temperature of the temperature controlled environment with a transition temperature setpoint; and associating the first temperature alarm setpoint with the means for providing a temperature controlled environment when the sensed temperature of the controlled environment is one of at least equal to and greater than the transition temperature setpoint. The method can further comprise wherein the first temperature alarm setpoint is greater than the second temperature alarm setpoint. The method can further comprise the steps of: pre-associating the first temperature alarm setpoint with the means for providing a temperature controlled environment prior to comparing the sensed temperature of the controlled environment with the transition temperature setpoint to provide a pre-association therewith; maintaining the pre-association of the first temperature alarm setpoint with the means for providing a temperature controlled environment when the sensed temperature of the temperature controlled environment is one of at least equal to and greater than the transition temperature setpoint; disassociating the first temperature alarm setpoint with the means for providing a temperature controlled environment when the sensed temperature of the temperature controlled environment is one of less than and at most equal to the transition temperature setpoint; and associating the second temperature alarm setpoint with the means for providing a temperature controlled environment when the sensed temperature of the controlled environment is one of less than and at most equal to the transition temperature setpoint.

In a first embodiment of a system of the present invention, the invention is directed to a system for automatically associating one set of at least two sets of temperature alarm setpoints with means for providing a temperature controlled environment. The at least two sets of temperature alarm setpoints include a first set having a high temperature alarm setpoint and a low temperature alarm setpoint, and a second set having a high temperature alarm setpoint and a low temperature alarm setpoint. The high temperature alarm setpoint of the first set is greater than the high temperature alarm setpoint of the second set, and the low temperature alarm setpoint of the first set is greater than the low temperature alarm setpoint of the second set. The system comprises: a sensor for sensing the temperature of the temperature controlled environment to generate a sensed temperature; a comparator for comparing the sensed temperature of the temperature controlled environment with a transition temperature setpoint; and wherein, in response to the comparison, the first set of temperature alarm setpoints is associated with the means for providing a temperature controlled environment when the sensed temperature of the controlled environment is one of at least equal to and greater than the transition temperature setpoint. The system can further comprise wherein: the first set of temperature alarm setpoints are pre-associated with the means for providing a temperature controlled environment prior to comparing the sensed temperature of the temperature controlled environment with the transition temperature setpoint to provide a pre-association therewith; and wherein the pre-association of the first set of temperature alarm setpoints is maintained with the means for providing a temperature controlled environment when the sensed temperature of the temperature controlled environment is one of at least equal to and greater than the transition temperature setpoint. Furthermore, the system can further comprise wherein: the first set of temperature alarm setpoints is pre-associated with the means for providing a temperature controlled environment prior to the comparator comparing the sensed temperature of the controlled environment with the transition temperature setpoint to provide a pre-association therewith; and the pre-association of the first set of temperature alarm setpoints is maintained with the means for providing a temperature controlled environment when the sensed temperature of the temperature controlled environment is one of at least equal to and greater than the transition temperature setpoint; the first set of temperature alarm setpoints is disassociated with the means for providing a temperature controlled environment when the sensed temperature of the temperature controlled environment is one of less than and at most equal to the transition temperature setpoint; and the second set of temperature alarm setpoints is associated with the means for providing a temperature controlled environment when the sensed temperature of the controlled environment is one of less than and at most equal to the transition temperature setpoint.

In a second embodiment of a system of the present invention, the invention is directed to a system for automatically selecting temperature alarm setpoints for at least one of a cooler and a freezer, the at least one of the cooler and the freezer providing a temperature controlled environment. The system comprises: storage means, such as a memory, for storing in the memory at least two sets of temperature alarm setpoints, the at least two sets of temperature alarm setpoints including a first set of high and low temperature alarm setpoints for a cooler, and a second set of high and low temperature alarm setpoints for a freezer; storage means, such as a memory, for storing in the memory a transition temperature setpoint; a temperature sensor for sensing the temperature of the temperature controlled environment provided by the at least one of the cooler and the freezer thereby generating a sensed temperature; and a comparator for comparing the sensed temperature of the temperature controlled environment with the transition temperature setpoint stored in memory; wherein the first set of temperature alarm setpoints for a cooler is selected when the sensed temperature of the temperature controlled environment is one of at least equal to and greater than the transition temperature setpoint stored in memory; and the second set of temperature alarm setpoints for a freezer is selected when the sensed temperature of the temperature controlled environment is one of less than and at most equal to the transition temperature setpoint stored in memory. The system can further comprise wherein: the first set of temperature alarm setpoints for a cooler is pre-selected prior to comparing the sensed temperature of the temperature controlled environment with the transition temperature setpoint stored in memory to provide a pre-selection therefor; and wherein the pre-selection of the first set of temperature alarm setpoints for a cooler is maintained when the sensed temperature of the temperature controlled environment is one of at least equal to and greater than the transition temperature setpoint stored in memory. In addition, the system can further comprise wherein: the first set of temperature alarm setpoints is pre-selected for a cooler prior to comparing the sensed temperature of the temperature controlled environment with the transition temperature setpoint stored in memory to provide a pre-selection therefor; the pre-selection of the first set of temperature alarm setpoints is maintained for a cooler when the sensed temperature of the temperature controlled environment is one of at least equal to and greater than the transition temperature setpoint stored in memory; the first set of temperature alarm setpoints for a cooler is un-selected when the sensed temperature of the temperature controlled environment is one of less than and at most equal to the transition temperature setpoint stored in memory; and the second set of temperature alarm setpoints for a freezer is selected when the sensed temperature of the temperature controlled environment is one of less than and at most equal to the transition temperature stored in memory.

In a third embodiment of a system of the present invention, the invention is directed to a system for automatically selecting temperature alarm setpoints for at least one of a cooler and a freezer, the at least one of the cooler and the freezer providing a temperature controlled environment. The system comprises: an electrically erasable memory in which high and low temperature alarm setpoints for the cooler and for the freezer are stored; a program memory in which a transition temperature setpoint is stored; a working memory operatively coupled to the electrically erasable memory and to the program memory into which the high and low temperature alarm setpoints for the cooler are transferred from the electrically erasable memory and into which the transition temperature setpoint is transferred from the program memory; a sensor for sensing the temperature of the temperature controlled environment provided by the at least one of the cooler and the freezer thereby generating a sensed temperature; and a comparator operatively coupled to the sensor for comparing the sensed temperature of the temperature controlled environment with the transition temperature setpoint and generating an output in response thereto; wherein if, in response to the output of the comparator, the sensed temperature of the temperature controlled environment is one of at least equal to and greater than the transition temperature setpoint, then the high and low temperature alarm setpoints for the cooler are maintained in the working memory; and if, in response to the output of the comparator, the sensed temperature of the temperature controlled environment is one of less than and at most equal to the transition temperature setpoint, then the high and low temperature alarm setpoints for the freezer are transferred from the electrically erasable memory to the working memory and the high and low temperature alarm setpoints for the cooler are overwritten with the high and low temperature alarm setpoints for the freezer. The system can further comprise wherein: after the high and low temperature alarm setpoints for the cooler are overwritten with the high and low temperature alarm setpoints for the freezer, the selection of the temperature alarm setpoints for the freezer is maintained in the working memory if the sensed temperature of the temperature controlled environment is one of at least equal to and greater than the transition temperature setpoint.

In a fourth embodiment of a system of the present invention, the invention is directed to a system for automatically associating one of at least two temperature alarm setpoints with means for providing a temperature controlled environment. The system comprises: a sensor for sensing the temperature of the temperature controlled environment to generate a sensed temperature; and a comparator operatively coupled to the sensor for comparing the sensed temperature of the temperature controlled environment with a transition temperature setpoint; wherein one of the temperature alarm setpoints is associated with the means for providing a temperature controlled environment when the sensed temperature of the controlled environment is one of at least equal to and greater than the transition temperature setpoint.

In a fifth embodiment of a system of the present invention, the invention is directed to a system for automatically associating one of at least a first temperature alarm setpoint and a second temperature alarm setpoint with means for providing a temperature controlled environment, the system comprising: a sensor for sensing the temperature of the temperature controlled environment to generate a sensed temperature; and a comparator operatively coupled to the sensor for comparing the sensed temperature of the temperature controlled environment with a transition temperature setpoint; wherein the first temperature alarm setpoint is associated with the means for providing a temperature controlled environment when the sensed temperature of the controlled environment is one of at least equal to and greater than the transition temperature setpoint. The system can further comprise wherein the first temperature alarm setpoint is greater than the second temperature alarm setpoint. The system can further comprise wherein: the first temperature alarm setpoint is pre-associated with the means for providing a temperature controlled environment prior to comparing the sensed temperature of the controlled environment with the transition temperature setpoint to provide a pre-association therewith; the pre-association of the first temperature alarm setpoint with the means for providing a temperature controlled environment is maintained when the sensed temperature of the temperature controlled environment is one of at least equal to and greater than the transition temperature setpoint; the first temperature alarm setpoint is disassociated with the means for providing a temperature controlled environment when the sensed temperature of the temperature controlled environment is one of less than and at most equal to the transition temperature setpoint; and the second temperature alarm setpoint is associated with the means for providing a temperature controlled environment when the sensed temperature of the controlled environment is one of less than and at most equal to the transition temperature setpoint.

For a better understanding of the present invention, reference is made to the following detailed description to be taken in conjunction with the accompanying drawings and its scope will be defined in the appended claims.

DETAILED DESCRIPTION OF THE PREFERRED EMBODIMENTS

FIGS. 1 through 3C will be utilized to describe the preferred embodiments of the invention. While the invention will be described in connection with the preferred embodiments, it will be understood that the description is not intended to limit the invention to these embodiments. On the contrary, it is intended to cover all alternatives, modifications and equivalents as may be included within the scope and spirit of the invention as defined by the claims.

Figure 1:
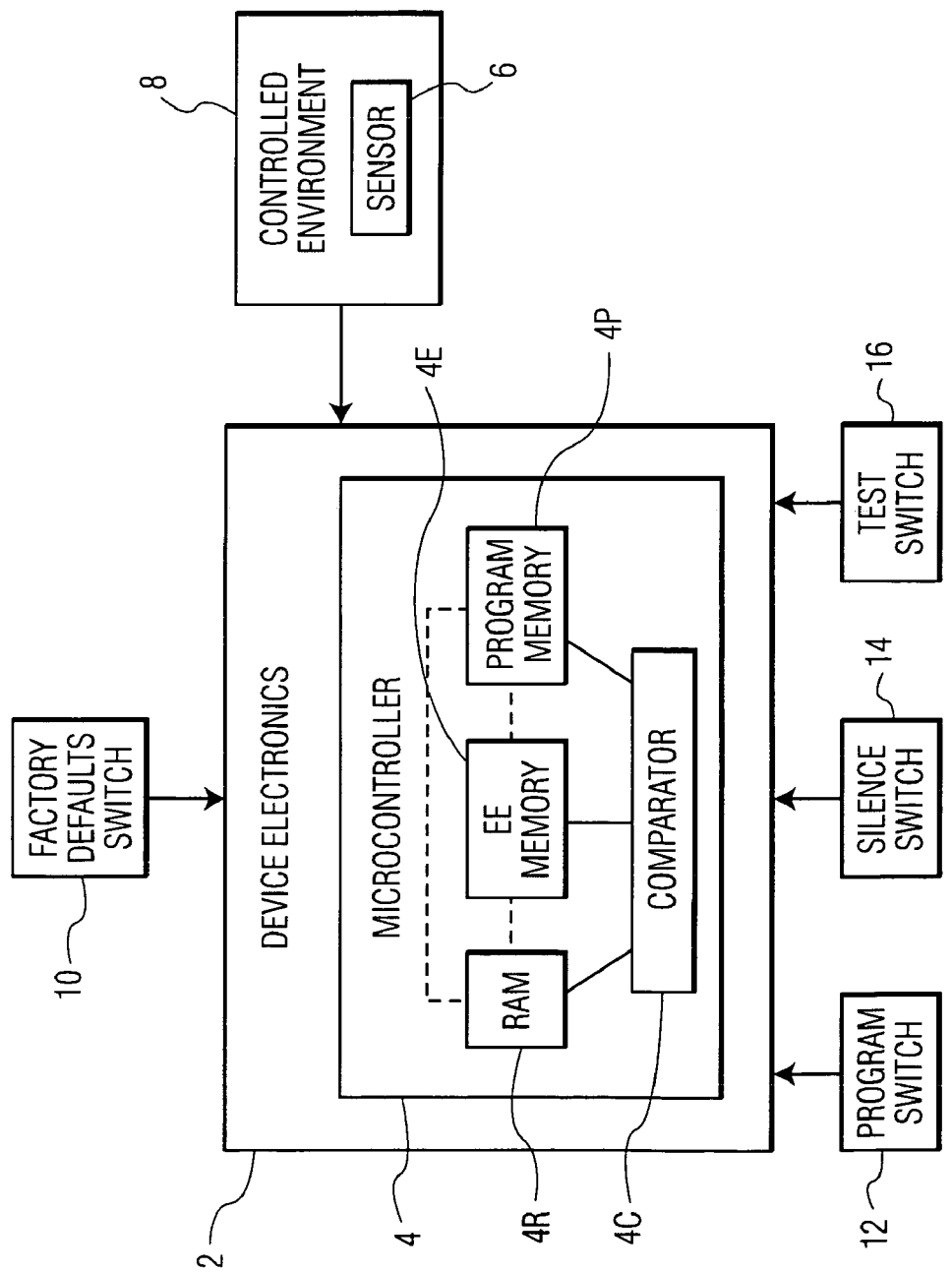
FIG. 1 is a block diagram of the relevant components and functional configuration of the apparatus formed in accordance with the present invention.
Figure 2A:
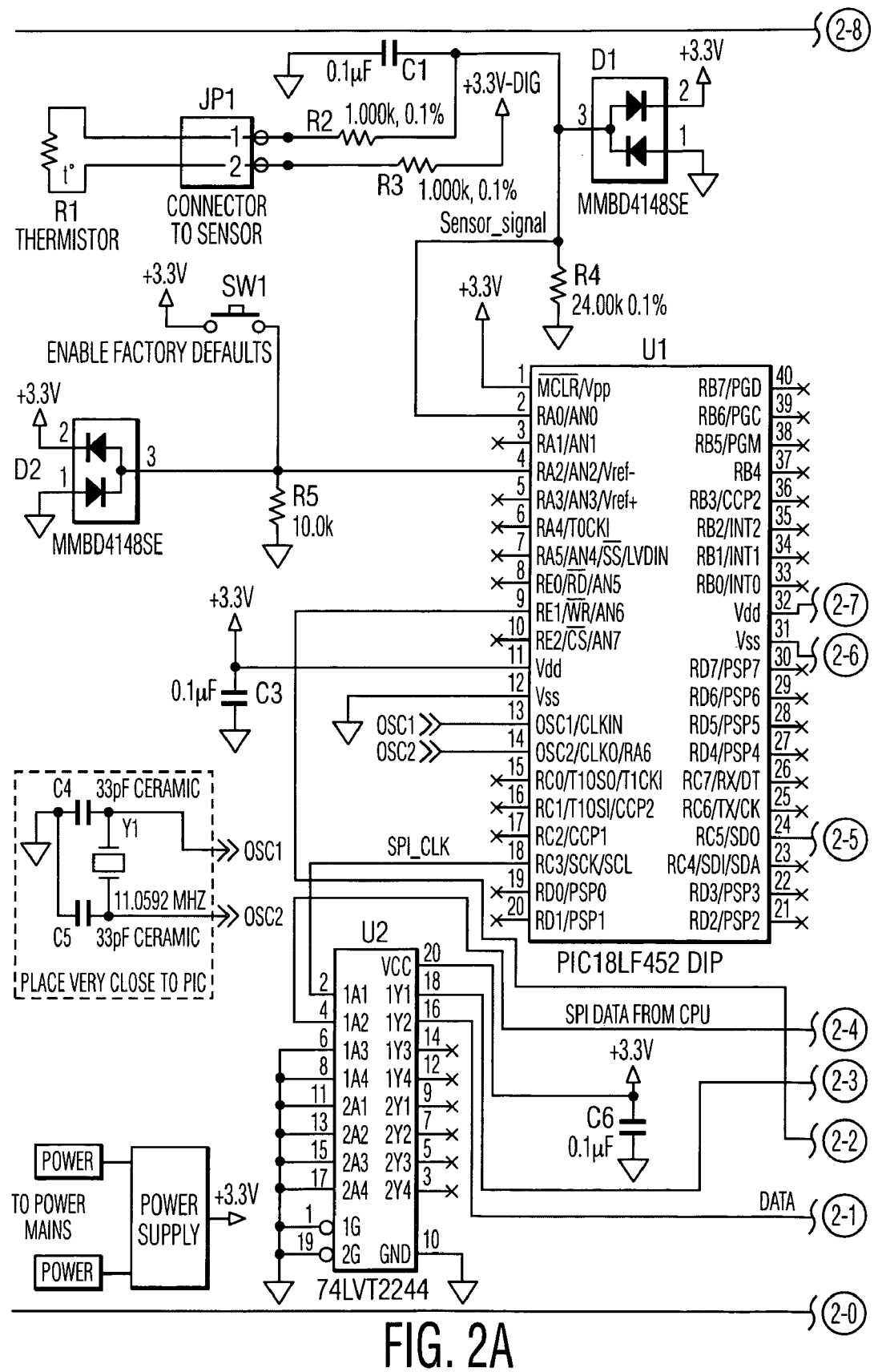
FIG. 2A is a detailed schematic drawing illustrating the circuitry of the present invention with relevant components labeled.
Figure 2B:
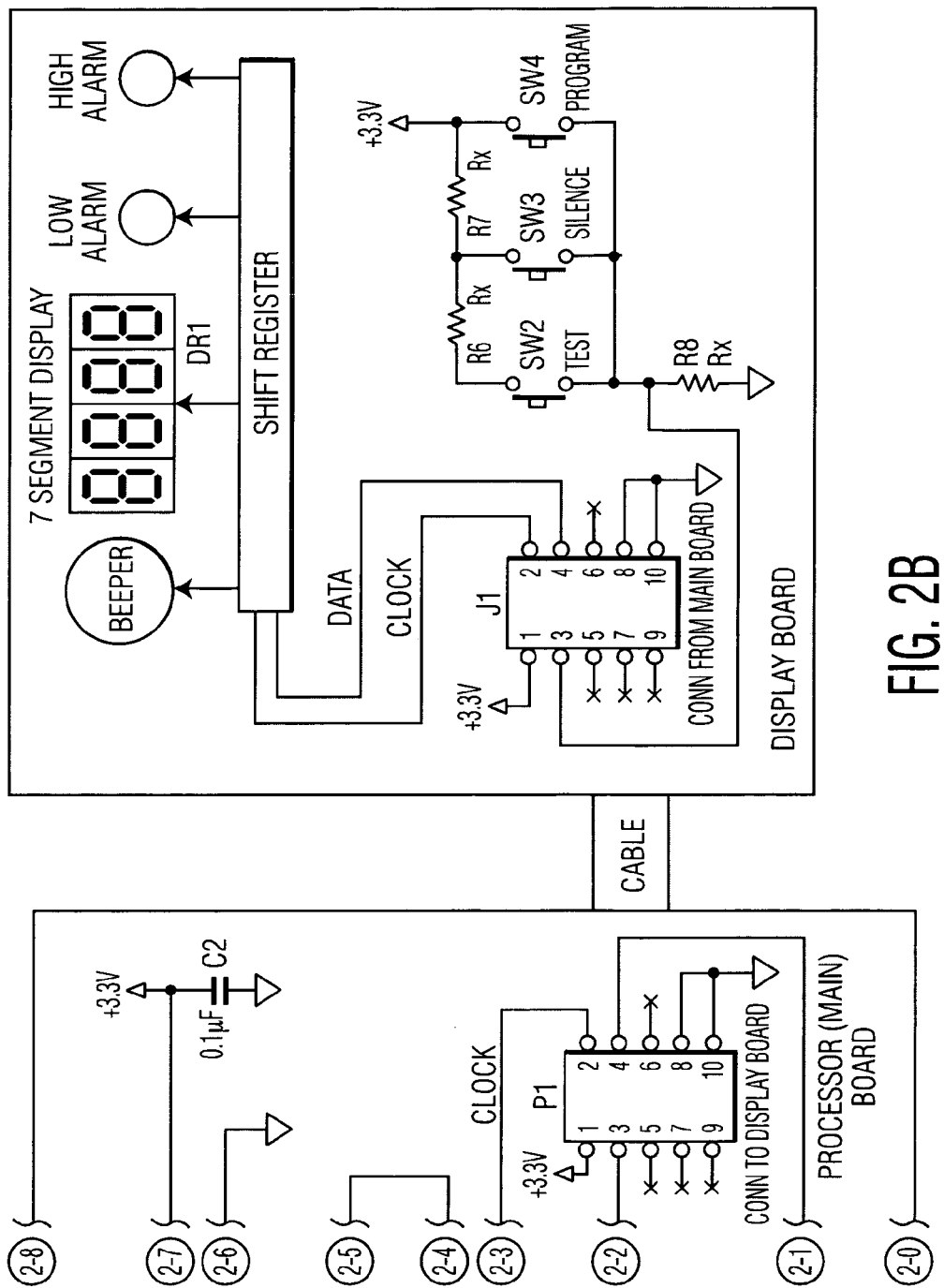
FIG. 2B is a continuation of the detailed schematic of FIG. 2A.

Referring to FIG. 1, central to the operation of the invention is the device electronics (2) which contains the circuitry and power supply necessary for the apparatus to perform its intended functionality. The device electronics can be based on a purely hardware design using discrete components such as logic gates, timers and other electronic components configured into a circuit which will perform this functionality, or it can be based on a microprocessor or microcontroller design whereby, in addition to circuit configuration, the functionality is defined by a software program. In either approach the resultant performance of the invention will be the same. The microcontroller (4), illustrated inside of the device electronics (2), is indicative of the design approach of utilizing a microcontroller (4), along with accompanying software, as the preferred embodiment. In FIG. 2, the schematic drawing, the microcontroller (4) is identified as U1, and the device utilized in the preferred embodiment is a PIC18LF452 as manufactured by Microchip Technology, Inc. of Chandler, Ariz.

Figure 3A:
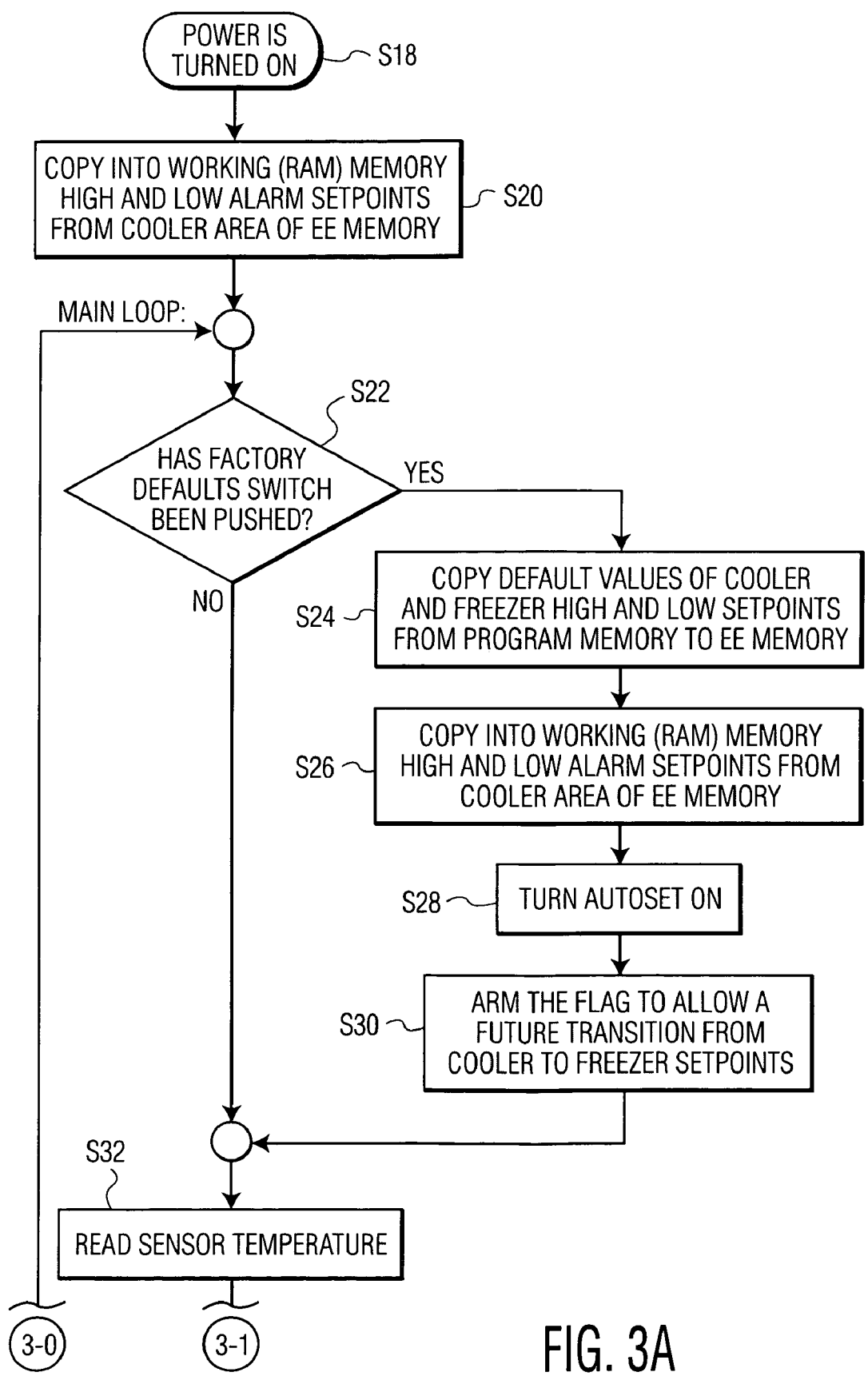
FIG. 3A is a flow chart showing the relevant functional operations of the apparatus of the present invention.
Figure 3B:
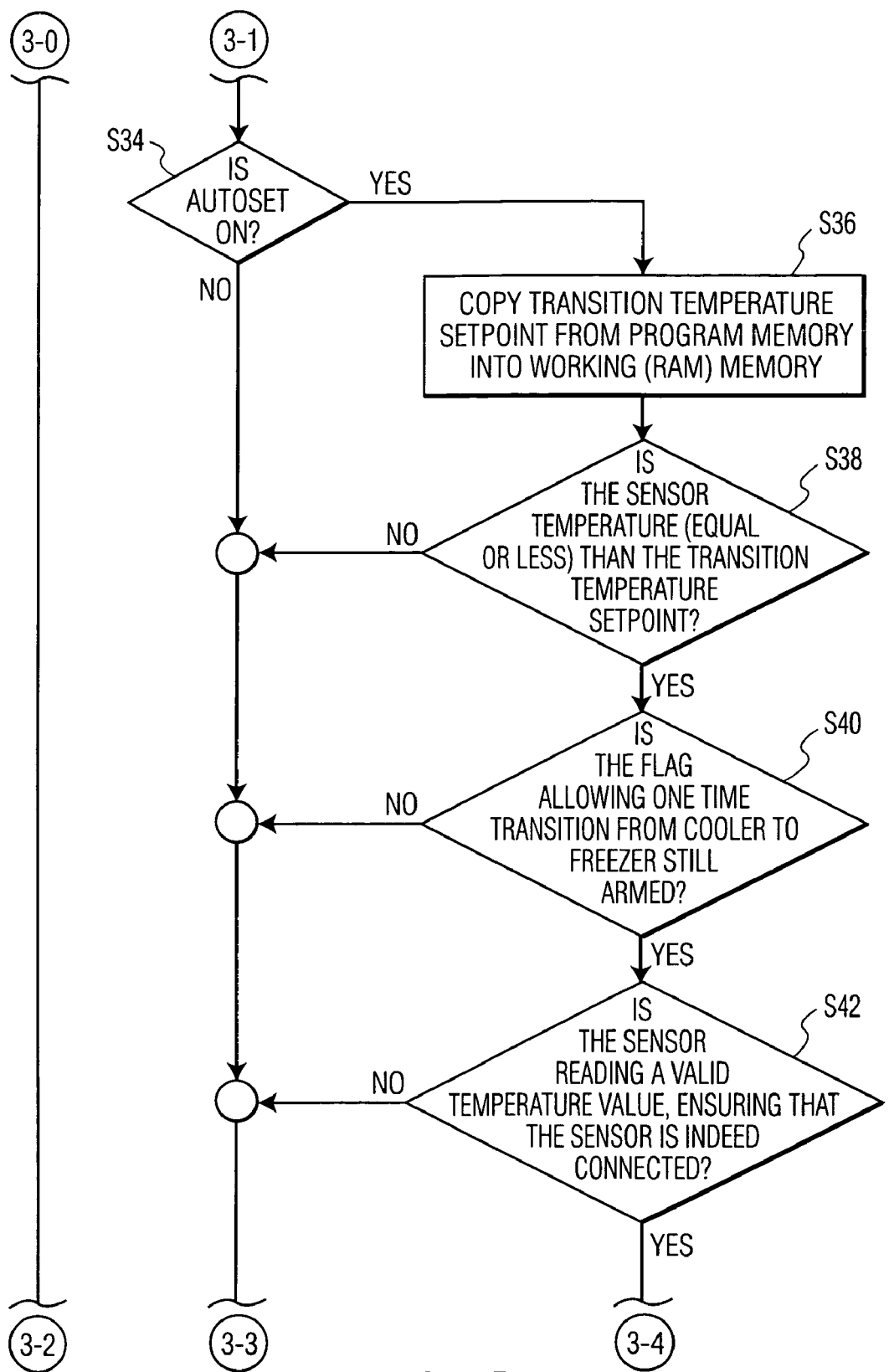
FIG. 3B is a continuation of the flow chart of FIG. 3A.
Figure 3C:
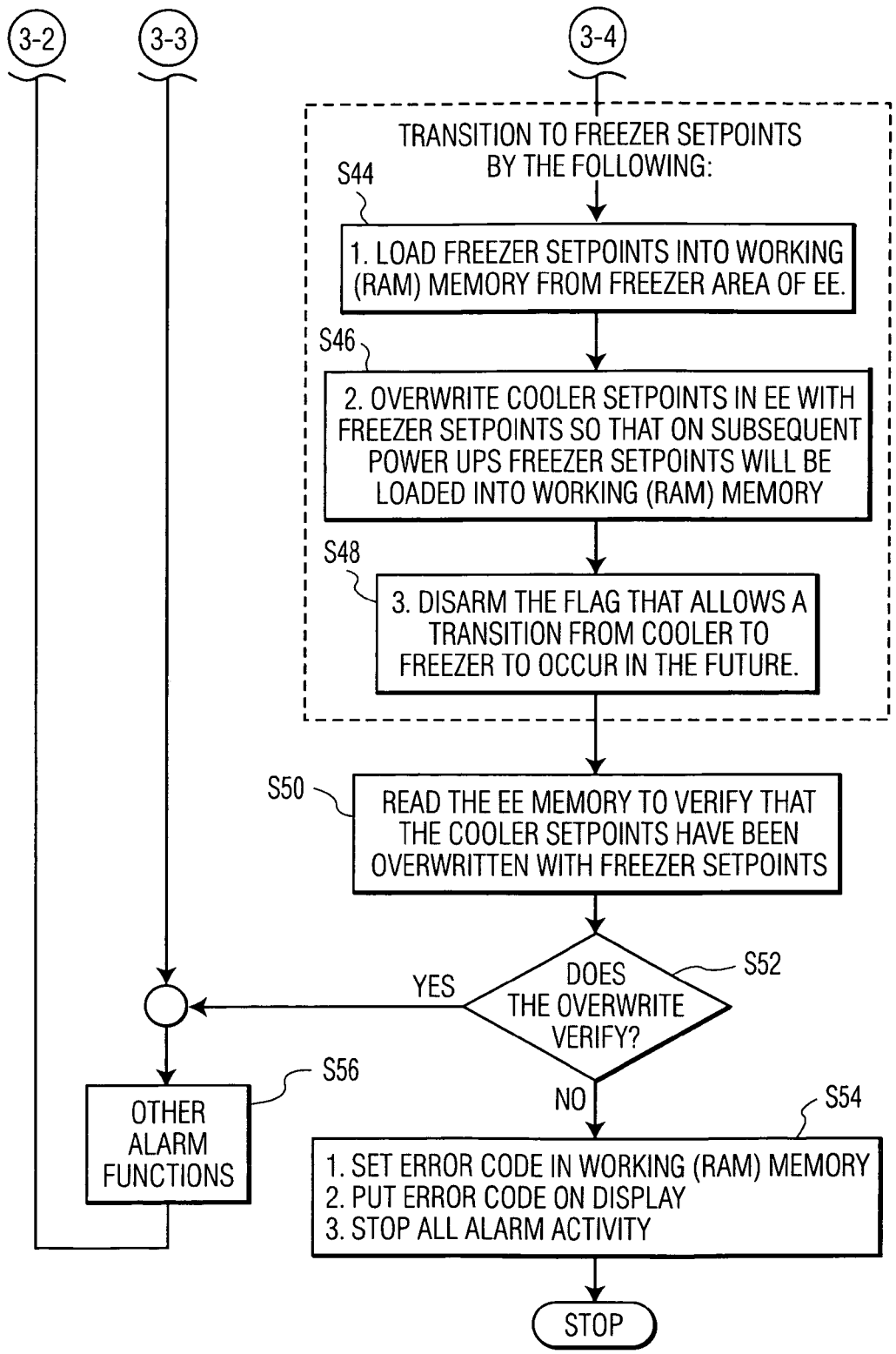
FIG. 3C is a continuation of the flow chart of FIGS. 3A and 3B.

The sensor (6) is located inside of the controlled environment (8) indicating the proper location of the sensor (6) for performing its intended function. As the temperature of the controlled environment (8) changes, it is essential that the sensor (6) creates a signal or otherwise manifests a change in its output that is in some way analogous to or indicative of the temperature change within the controlled environment (8) for the invention to work properly. Some common types of such devices are thermistors, thermocouples or resistance temperature detectors (RTD's). In the preferred embodiment, the sensor (6) is a thermistor. The sensor (6) is connected to the device electronics (2) and ultimately to the microcontroller (4) so that the signal or change generated by the sensor (6) can be utilized in helping the device to determine the nature of the controlled environment (8). The method by which this task is performed will be later disclosed upon review of the flow chart (FIG. 3). In FIG. 2, the schematic drawing, the sensor is identified as R1. As the sensor (6) is remotely mounted inside of the controlled environment (8), component JP1 on FIG. 2, a terminal block on the device electronics (2) main circuit board, is provided as a means of connecting the sensor (6) to the device electronics (2). Resistors R2, R3, R4, capacitor C1 and diode D1 on FIG. 2 are part of the device electronics (2), and are included as a means of conditioning and scaling the signal coming from the sensor (6) before it connects to the microcontroller (4).

The factory defaults switch (10) is, in the preferred embodiment, a momentary push button switch that, while represented as an external block for clarity, is actually contained within the device electronics (2) and provides a means for restoring factory default settings for device operation. These factory defaults and the functions that they perform will be described in greater detail upon review of the flow chart (FIG. 3). Restoration of the factory defaults is not typically a user function. Therefore, in the preferred embodiment, the factory defaults switch (10) is positioned in such a location on the device electronics (2) main circuit board that it can only be accessed if the device faceplate is removed. In FIG. 2, the schematic drawing, the factory defaults switch (10) is identified as SW1. Resistor R5 and diode D2 on FIG. 2 are part of the device electronics (2) and operate with SW1 in the following manner. Working in conjunction with switch SW1, resistor R4 is provided as a means of establishing a logic zero condition in the absence of the factory defaults switch (10) being pressed. Diode D2 is provided as a means of conditioning the signal coming from the factory defaults switch (10) before it connects to the microcontroller (4).

Although typically the microcontroller (4) performs comparison between the temperature sensed by the sensor (6) to temperature data stored in the memory of the microcontroller (4), a comparator (4C) can be used solely for the comparison, using the device electronics (2) without the microcontroller (4). The microcontroller (4) includes typically program memory (4P), electrically or electronically erasable (EE) memory (4E), and working or random access memory (RAM) (4M). The comparison function of the microcontroller (4) is inherent in the microcontroller (4) and is represented by comparator (4C).

The program switch (12) is, in the preferred embodiment, a momentary push button switch that, while represented as an external block for clarity, is actually contained within the device electronics (2) and provides a means for changing the operating mode of the device from "run mode", which is the standard mode of device operation, to "program mode", which is the mode from which changes to operating parameters may be made.

The silence switch (14) is, in the preferred embodiment, a momentary push button switch that, while represented as an external block for clarity, is actually contained within the device electronics (2) and, depending on the selected mode, has a dual purpose for device operation. In "run mode", the silence switch (14) provides a means for manually responding to an alarm condition that may occur. In "program mode", the function of the silence switch (14) changes so as to provide a means for manually changing the value of an operating parameter, such as an temperature alarm setpoint.

The test switch (16) is, in the preferred embodiment, a momentary push button switch that, while represented as an external block for clarity, is actually contained within the device electronics (2) and, depending on the selected mode, has a dual purpose for device operation. In "run mode", the test switch (16) provides a means for manually initiating a device test routine. In "program mode", the function of the test switch (16) changes so as to provide a means for manually changing the value of an operating parameter, such as an temperature alarm setpoint.

Contained within the program menu of "program mode" is a menu choice that will allow for disabling of the autoset function. The program switch (12), the silence switch (14) and the test switch (16) are utilized together as a means for disabling the autoset function. This disable procedure and its effect on device operation will be described in greater detail upon review of the flow chart (FIG. 3). The program switch (12), the silence switch (14) and the test switch (16) are all incorporated into the device as a means of providing access to user functions. As a result, in the preferred embodiment and as illustrated in FIG. 2, these three switches are positioned on the display board. The display board, while physically separate from the main board, is electrically connected to the main board through the connectors identified as P1 and J1. In the preferred embodiment, this physical configuration allows the display board to be mounted on the faceplate of the device, thus providing user access to the three switches as well as to the other devices designed to communicate information to the user. These other devices include the High and low alarm lights, the seven segment display (DR1) and the beeper. In FIG. 2, the schematic drawing, the program switch (12) is identified as SW4, the silence switch (14) is identified as SW3 and the test switch (16) is identified as SW2. Resistors R6, R7 and R8 on FIG. 2 are part of the device electronics (2), and are included as a means of creating a voltage divider network. The matrix created by the combining of these resistors and switches as shown in FIG. 2 provides a means for creating unique and different voltage outputs, depending on the switch that is pressed. When one of the switches is pressed, the resultant voltage output, connected to the main board by connectors P1 and J1, is sent to the microcontroller (4) as a signal to be processed within the microcontroller (4) itself so that the appropriate resultant action is performed.

Prior to beginning a review of the flow chart so as to explain actual operation of the invention, it is necessary to disclose procedures relevant to the operation of the invention that are firstly, performed before power has ever been supplied to the device and that are secondly, performed once the device has been powered for the very first time so that the device will be able to operate in a manner as described by the flow chart (FIG. 3). These procedures are as follows: Firstly, before power has ever been supplied to the device and before the microcontroller (4) has been installed into the circuitry, software code, relevant to the operation of the invention, is programmed into the microcontroller (4). A computer program, i.e., software code, for the flow chart of FIG. 3 in accordance with the present invention is provided herewith as part of the disclosure of the invention. Contained within this code are relevant pre-selected parameter values and settings to be used as factory defaults for device operation. In the preferred embodiment, these relevant factory default parameter values are:

1) The ability to automatically detect if a controlled environment (4) is a cooler or a freezer (the autoset function) will be on (enabled).
2) A high temperature alarm setpoint of 45° F. and a low temperature alarm setpoint of 30° F. are selected as setpoints for monitoring a cooler. These represent typical cooler setpoints as a cooler will normally operate at 34° F. to 38° F.
3) A high temperature alarm setpoint of 10° F. and a low temperature alarm setpoint of –20° F. are selected as setpoints for monitoring a freezer. These represent typical freezer setpoints as a freezer will normally operate at –10° F. to 05° F.
4) A transition temperature setpoint of 10° F. is selected. The transition temperature setpoint is the temperature setpoint that the invention uses to determine if the monitored compartment is a cooler or a freezer. The transition temperature setpoint is independent of any of the other previously mentioned temperature setpoints and thus, may be programmed to any temperature. However, in the preferred embodiment, the transition temperature setpoint is set to the same temperature as the high temperature alarm setpoint for a freezer. (Both are set at 10° F.).

Secondly, when the programmed microcontroller (4) is installed into the circuitry and the device has been powered for the very first time, it is necessary to momentarily press the factory defaults switch (10). When this is done, the following occurs:

1) The previously disclosed high and low cooler and freezer setpoint values are copied from program memory (4P) to an electrically erasable (EE) memory (4E).
2) The previously disclosed high and low cooler setpoint values are copied from EE memory (4E) to a working random access memory (RAM) memory (4R).
3) The previously disclosed autoset function is turned on (enabled).
4) A flag in the software code is armed to allow for a future possible transition from cooler to freezer setpoints.

It is important to note that the previously mentioned transition temperature setpoint that is programmed into the microcontroller (4) is not affected by pressing the factory defaults switch (10) and therefore, is not listed above. The transition temperature setpoint is always available in program memory (4P), whether or not the factory defaults switch (10) is pressed. It is also important to note that the programming and installation of the microcontroller (4) and the pressing of the factory defaults switch (10) when the device is first powered up are part of the manufacturing process. Furthermore, it is important to note that all of the functions which occur when the factory defaults switch (10) is pressed are software functions which take place inside of the microcontroller (4) itself. Once the two above described procedures have taken place and subsequent testing has verified proper operation, the device is ready to perform in accordance with the flow chart (FIG. 3).

Referring now to the flow chart (FIG. 3) to explain actual operation of the invention, and subsequent to the procedures described above having taken place, operation is as follows: (Hereinafter, parenthesis which contain the letter S and a number refer to the method steps on the flow chart.)

Upon power up (S18) from a non-powered condition, in Step (S20), the device will first copy the high and low temperature alarm setpoints for a cooler from the EE memory (4E) to the working (RAM) memory (4R). This step (S20) of copying setpoints from EE memory (4E) to working (RAM) memory (4R0 will always occur whenever power has been restored after having been interrupted because, unlike EE memory (4E), which is non-volatile, the working (RAM) memory (4R) is volatile and therefore, will not retain these setpoints in the absence of power. Therefore, upon any subsequent power up, the copying process restores the setpoints into working (RAM) memory (4R). Once this copying is accomplished, the device enters into the main program loop of operation and first checks to see if the factory defaults switch (10) has been pressed (S22). If (S22) is no, then the next operation in the main loop is to go directly to reading the sensor (6) temperature (S32). However, if the decision box (S22) is yes, then, before reading the sensor (6) temperature (S32), and in a manner identical to the tasks performed as part of the manufacturing process when the factory defaults switch (10) is first pressed, the following will occur:

1) In (S24), the factory default high and low cooler and freezer setpoint values are copied from program memory (4P) to EE memory (4E).
2) In (S26), the factory default high and low cooler setpoint values are copied from EE memory (4E) to working (RAM) memory (4R).
3) The autoset function is turned on (enabled) (S28).
4) A flag in the software code is armed to allow for a future possible transition from cooler to freezer setpoints (S30).

Once the sensor (6) temperature has been read (S32), the next operation is to determine if the Autoset function is on or off (S34). As previously disclosed, contained within the program menu of "program mode" is a menu choice that will allow for the autoset function to be turned off (disabled). Disabling of the autoset function allows for manual selection of temperature alarm setpoints which may be desirable if the factory default settings are not appropriate for monitoring of a particular controlled environment (8). The program switch (12), the silence switch (14) and the test switch (16) are utilized together as a means for turning off the autoset function if so desired. In the preferred embodiment, this is accomplished in the following manner:

1) The program switch (12) is pressed, which causes the device to change from run mode to program mode.
2) In program mode, the 7 segment display (DR1, FIG. 2) displays the word "AUTO" for one second, and then displays the word "ON" constantly. The display of the word "ON" indicates that the autoset function is enabled.
3) In program mode, the silence switch (14) and the test switch (16) become the means for changing operating parameters. For functions where there are only two variables, namely on or off, these two switches perform simple toggle functions. Therefore, pressing either the silence switch (14) or the test switch (16) will toggle the display (DR1, FIG. 2), to read "ON" or "OFF". "OFF" is selected to turn the autoset function off.
4) Other parameter selections, not relevant to the invention, are also contained within program mode, and once the programming process has been completed, if "OFF" has been selected as the programming choice for the autoset function, then the autoset function will be turned off (disabled).

Once the autoset function has been turned off, the only way to re-enable the autoset function is to press the factory defaults switch (10). This will restore the factory defaults, which includes turning on the autoset function as previously disclosed.

Returning to the flow chart of FIG. 3, if it is determined that the autoset is not on (S34), then the main loop continues to other alarm functions (S56) which consists of routines performed by the device which are not relevant to the invention. The main loop then returns back to decision box (S22) and the process starts again. If decision box (S34) is yes, indicating that the autoset function is on, then in (S36) the transition temperature setpoint is copied from program memory (4P) into working (RAM) memory (4R). The device then compares the sensor (6) temperature with the transition temperature setpoint to determine if the sensor (6) temperature is equal to or less than the transition temperature setpoint (S38). If decision box (S38) is no, indicating that the temperature in the controlled environment (8) is typical of cooler operation, then the main loop again continues to other alarm functions (S56), back to decision box (S22) and the process starts again. In this scenario, temperature alarm setpoints remain at the cooler defaults. If decision box (S38) is yes, indicating that the temperature in the controlled environment (2) is typical of freezer operation, then the device checks to see if the flag allowing a one time transition from the default cooler setpoints to the default freezer setpoints is still armed (S40.) If decision box (S40) is no, this is indicative of the fact that the sensor (6) temperature had already been equal to or lower than the transition setpoint function on a prior passing of the program through the step indicated by (S40), that other conditions and functions yet to be disclosed had been met and had occurred, and that the high and low temperature alarm setpoints had already been changed to the freezer defaults. As a result, the no condition of decision box (S40) results in the main loop continuing to other alarm functions (S56), back to decision box (S22) and the process starts again. If decision box (S40) is yes, this means that the sensor (6) temperature is equal to or lower than the transition temperature setpoint for the first time. The device then checks to see if the sensor (6) temperature reading correlates to a valid temperature value, as opposed to the reading that would be generated if the probe was disconnected (S42). This function is important because the device preferably should be able to differentiate between a normal, freezer range, temperature sensor (6) reading and a reading that would be generated by a disconnected sensor (6). As previously disclosed, an open (disconnected) temperature sensor wire would generate the lowest possible reading. Therefore, if the function addressed by decision box (S42) is not present and the controlled environment (8) is a cooler, an open sensor wire condition that could occur when an alarm is being installed or that could occur in any other possible servicing condition when the sensor (6) is disconnected would be mistakenly interpreted as a controlled environment (8) operating as a freezer, with the resultant erroneous change from the cooler setpoints to the freezer setpoints taking place. To prevent this from occurring, the program has thus been designed to differentiate between these two conditions so as to avoid erroneously changing the setpoints when it is not appropriate. Therefore, returning to decision box (S42) of the flow chart, if decision box (S42) is no, this is indicative of the fact that the sensor (6) is disconnected. As a result, the high and low temperature alarm setpoints remain at the cooler defaults, the main loop continues to other alarm functions (S56), goes back to decision box (S22) and the process starts again. If decision box (S42) is yes, this indicates that the sensor (6) temperature reading is valid and that the sensor (6) is connected. Therefore, if decision box (S42) is yes, the transition to the freezer setpoints (the autoset function) occurs in the following manner:

1) In step (S44), the default high and low temperature alarm setpoints for a freezer are copied from the freezer setpoints area of EE memory (4E) to working (RAM) memory (4R). These setpoints replace the cooler setpoints in working (RAM) memory (4R) and will now be the ones utilized for the monitoring of the controlled environment (8).
2) The default cooler setpoints in EE memory are overwritten with the default freezer setpoints (S46). The default freezer setpoints now occupy the cooler area of EE memory so that on any subsequent power up the freezer setpoints will be loaded into working (RAM) memory. (This is in accordance with (S20) which always occurs upon power up.) The default cooler setpoints are now no longer available to be utilized regardless of how warm the temperature in the controlled environment (8) may become.
3) The flag that allows a transition from cooler to freezer to occur is disarmed (S48). This is in accordance with (S40) so that there is no recurrence of performance of the transition routine as described in 1 and 2 above.

After the transition from cooler setpoints to freezer setpoints is completed, the device then performs the test function of reading the EE memory (4E) to verify that the cooler setpoints have been overwritten with the freezer setpoints (S50). If the overwrite verifies, indicated as yes from decision box (S52), then the main loop continues to other alarm functions (S56), goes to the decision box (S22) and the process starts again. If the overwrite does not verify, indicated as no from decision box (S52), then an error code is set in working RAM) memory (4R), the error code is displayed on display (DR1) (FIG. 2) and all alarm activity is stopped (S54). This test routine is in place to terminate alarm operation if a catastrophic malfunction has occurred.

Once the autoset function has changed the setpoints from the cooler defaults to the freezer defaults, the setpoints will not change back to the cooler setpoints, regardless of how warm the temperature may become in the controlled environment (8). Therefore, if so desired, the only way to restore the cooler setpoints as the defaults is to warm the sensor (6) so that its temperature is higher than the transition temperature setpoint and then press the factory defaults switch (10) while the higher sensor (6) temperature condition exists. This will restore the cooler defaults as the operating setpoints.

This then, completes the description of the entire sequence of operation of the invention.

While the invention has been described in accordance with specific embodiments thereof, it is evident that many alternatives, modifications and variations will be apparent to those skilled in the art in light of the foregoing description. One such variation would be to provide a means for changing the values of the cooler or freezer setpoints as well as the transition temperature setpoint from the default values to other desired values, while still maintaining the autoset function in an enabled state. This would allow a user to utilize the autoset function, but to customize the setpoints for specific needs where the default setpoint values would not be appropriate. Another variation would be to apply the autoset function to multi-sensor systems, designed for the monitoring of multiple controlled environments from one device. In such a configuration, each sensor and the associated electronics and programming would independently have the autoset function and therefore, the device would have the ability to automatically configure the setpoints for each sensor in accordance with the temperature of each controlled environment being monitored. A further variation would be to add additional high and low default setpoints as well as an additional transition temperature setpoint so as to further expand product capabilities. An example and application would be in the realm of scientific refrigeration where compartments which operate in the "ultra low" temperature range of −40° F. or lower are commonplace. For such an application, in addition to the cooler, freezer and transition setpoints that have been previously disclosed, high and low temperature alarm setpoints as well as a transition temperature setpoint that is appropriate for an ultra low application could be added. Therefore, when so configured, the device would transition to the freezer setpoints when the first transition temperature is reached, and would transition again to the ultra-low setpoints when the ultra low transition temperature has been reached. In all of the aforementioned scenarios, the autoset function is designed to change setpoints in accordance with a drop in temperature, with the transition temperature setpoint being at or near the high temperature alarm setpoint that will be appropriate for the controlled environment. Therefore, another variation would be to provide the capability of changing setpoints in accordance with a rise in temperature, with the transition setpoint being at or near the low temperature alarm setpoint that will be appropriate for the controlled environment. Such an application might be in the monitoring of an incubator or other type of "warm room". In this scenario, a rising temperature would activate the autoset function in the same manner as described in the preferred embodiment, only responding to a rise in temperature as opposed to a drop in temperature. Also, although high and low cooler and freezer temperature alarm setpoints have been described, it is also possible to have a single temperature alarm setpoint for each of the cooler and freezer, for example, a high temperature alarm setpoint or a low temperature alarm setpoint, or a combination of a high and low temperature alarm setpoint, for the cooler and freezer, and other types of controlled environments. All of the above variations could be combined as well in various ways so as to provide alternative capabilities for the present invention. Accordingly, it is intended to embrace all such alternatives, modifications and variations as fall within the broad scope and spirit of the claims.

Operational Software Code for the System and Methods for Providing Automatic Adjustment of Operating Setpoints for a Monitoring Device

```
void autoset(void)
{
    // Thin function will operate on 3 setpt arrays.
    //
    // 1. runtime_setpt_degree_sc[4] in RAM
    // 2. cooler_setpt_degree_sc[4] in EE
    // 3. freezer_setpt_degree_sc[4] in EE
    //
    // Each array contains the P1_HI, P1_LO, P2_HI, P2_LO setpts.
    //
    // It is required that once an alarm transitions into FREEZER mode it will always
    // remain in FREEZER mode forever, (i.e. operate with FREEZER setpts) even on
    // subsequent power ups.
    //
    // At the factory:
    // Pressing of the LOAD_DEFAULT switch on main board will execute a function
    // that will load the STANDARD autoset setpts into cooler_setpt_degree_sc[4] and
    // freezer_setpt_degree_sc[4] - both in EEDATA. Program will then beep twice.
    //
    // For custom autoset setpoints use of the ADJUST_SETPT push switch will execute a
    // function that will allow factory manual setting of the cooler_setpt_degree_sc[4]
    // and freezer_setpt_degree_sc[4] into EEDATA.
    //
    // At the customer's site:
    // By definition the alarm powers up with autoset ON and in COOLER mode. The
    // power up code will retrieve cooler_setpt_degree_sc[4] from EEDATA and write it into
    // runtime_setpt_degree_sc[4] in RAM. The alarm is now operational with COOLER setpts.
    //
    // Each time around the RUN loop this function will (with autoset ON only)
    // examine the temperature to decide if an individual probe is located in a COOLER or a
    // FREEZER by comparing the current probe temperature to the TRANSITION_TEMP.
    //
    // If a probe cools to EQUAL or BELOW the TRANSITION_TEMP the appropriate 2 elements of
    // runtime_setpt_degree_sc[4] in RAM corresponding to the current probe
    // will be loaded with the corresponding 2 elements of freezer_setpt_degree_sc[4] from EED
    // To meet the requirement on "forever" being in FREEZER mode once it is entered,
    // the 2 elements of cooler_setpt_degree_sc[4] in EEDATA will now also be overwritten with
    // 2 elements of freezer_setpt_degree_sc[4] to handle any future power up situations.
    //
    // If the end user turns autoset OFF (in PROG or via SPRM) he must put in manual
    // prog_setpt_degree_sc[4] values. These will be copied to runtime_setpt_degree_sc[4]
    // upon the SUCCESSFUL completion of PROG. These new setpts are also copied to
    // cooler_setpt_degree_sc[4] in EEDATA and freezer_setpt_degree_sc[4] in EEDATA so that on
    // subsequent power ups, whether above or below the TRANSITION_TEMP, the previously
    // manually entered setpts will be used.
    //
    // The only way to turn autoset back on is to enable factory defaults via the
    // LOAD_DEFAULT push button.
    //
    signed char transition_temp_sc;
    unsigned char eeprom_error_uc = 0;
    if(runtime_scale_uc == 'F')
        transition_temp_sc = TRANSITION_TEMP_F_ONLY; // probex_degree_sc is of current scale
    else
    {
        transition_temp_sc = convert_f_to_c(TRANSITION_TEMP_F_ONLY);
    }
    if(probe1_degree_sc <= transition_temp_sc && p1_transition_executed_f == FALSE &&
                                    probe1_ui > LOWEST_LEGAL_A2D_CNT)
    {        // Transition to the freezer setpts
```

-continued

```
    runtime_setpt_degree_sc[P1_HI] = (signed char)eeprom_read(STR_P1_HI_FREEZER_DEGREE_SC_A
    runtime_setpt_degree_sc[P1_LO] = (signed char)eeprom_read(STR_P1_LO_FREEZER_DEGREE_SC_A
    // Overwrite cooler setpts in EE with freezer setpts so on subsequent power ups
    // it will be using freezer setpts.
    eeprom_write(STR_P1_HI_COOLER_DEGREE_SC_ADX, (unsigned char)runtime_setpt_degree_sc[P1_
    eeprom_write(STR_P1_LO_COOLER_DEGREE_SC_ADX, (unsigned char)runtime_setpt_degree_sc[P1_
    p1_transition_executed_f = TRUE;     // Set flag to prevent forever writing to EEPROM
        // On subsequent powerups it may write just one time if the flag wasn't set.
    while(WR == 1);                       // Wait for write to finish (4–8 ms)
        // Verify overwrite for probe 1
    if(((signed char)eeprom_read(STR_P1_HI_COOLER_DEGREE_SC_ADX)) !=
                (signed char)eeprom_read(STR_P1_HI_FREEZER_DEGREE_SC_ADX))
            ||
    ((signed char)eeprom_read(STR_P1_LO_COOLER_DEGREE_SC_ADX) !=
                (signed char)eeprom_read(STR_P1_LO_FREEZER_DEGREE_SC_ADX)))
    {
        eeprom_error_uc = 0xFF;
    }
}
if(probe2_degree_sc <= transition_temp_sc && p2_transition_executed_f == FALSE &&
                            probe2_ui > LOWEST_LEGAL_A2D_CNT)
{       // Transition to the freezer setpts
    runtime_setpt_degree_sc[P2_HI] = (signed char)eeprom_read(STR_P2_HI_FREEZER_DEGREE_SC_A
    runtime_setpt_degree_sc[P2_LO] = (signed char)eeprom_read(STR_P2_LO_FREEZER_DEGREE_SC_A
    // Overwrite cooler setpts in EE with freezer setpts so on subsequent power ups
    // it will be using freezer setpts.
    eeprom_write(STR_P2_HI_COOLER_DEGREE_SC_ADX, (unsigned char)runtime_setpt_degree_sc[P2_
    eeprom_write(STR_P2_LO_COOLER_DEGREE_SC_ADX, (unsigned char)runtime_setpt_degree_sc[P2_
    p2_transition_executed_f = TRUE;      // Set flag to prevent forever writing to EEPROM
        // On subsequent powerups it may write just one time if the flag wasn't set.
    while(WR == 1);                       // Wait for write to finish (4–8 ms)
    // Verify the writes to EEPROM
    if(((signed char)eeprom_read(STR_P2_HI_COOLER_DEGREE_SC_ADX) !=
                (signed char)eeprom_read(STR_P2_HI_FREEZER_DEGREE_SC_ADX))
            ||
    ((signed char)eeprom_read(STR_P2_LO_COOLER_DEGREE_SC_ADX) !=
                (signed char)eeprom_read(STR_P2_LO_FREEZER_DEGREE_SC_ADX)))
    {
        eeprom_error_uc = 0xFF;
    }
}
if(eeprom_error_uc == 0xFF)
{
    seven_seg_data_uc[0] = 'E';           // Display "E 03" forever and STOP
    seven_seg_data_uc[1] = ' ';
    seven_seg_data_uc[2] = '0';
    seven_seg_data_uc[3] = '3';
    update_display( );
    do{ }while(FOREVER);                  // Loop here FOREVER if EEPROM write verify fails
}
return;
}
```

What is claimed is:

1. A method of automatically associating one set of at least two sets of temperature alarm setpoints with means for providing a temperature controlled environment, the at least two sets of temperature alarm setpoints including a first set having a high temperature alarm setpoint and a low temperature alarm setpoint, and a second set having a high temperature alarm setpoint and a low temperature alarm setpoint, the high temperature alarm setpoint of the first set being greater than the high temperature alarm setpoint of the second set, and the low temperature alarm setpoint of the first set being greater than the low temperature alarm setpoint of the second, which comprises the steps of:

sensing the temperature of the temperature controlled environment to generate a sensed temperature;

comparing the sensed temperature of the temperature controlled environment with a transition temperature setpoint; and associating the first set of temperature alarm setpoints with the means for providing a temperature controlled environment when the sensed temperature of the controlled environment is one of at least equal to and greater than the transition temperature setpoint.

2. A method as defined by claim 1, which further comprises the steps of:

pre-associating the first set of temperature alarm setpoints with the means for providing a temperature controlled environment prior to comparing the sensed temperature of the temperature controlled environment with the transition temperature setpoint to provide a pre-association therewith; and maintaining the pre-association of the first set of temperature alarm setpoints with the means for providing a temperature controlled environment when the sensed temperature of the temperature controlled environment is one of at least equal to and greater than the transition temperature setpoint.

3. A method as defined by claim 1, which further comprises the steps of:
pre-associating the first set of temperature alarm setpoints with the means for providing a temperature controlled environment prior to comparing the sensed temperature of the controlled environment with the transition temperature setpoint to provide a pre-association therewith;
maintaining the pre-association of the first set of temperature alarm setpoints with the means for providing a temperature controlled environment when the sensed temperature of the temperature controlled environment is one of at least equal to and greater than the transition temperature setpoint;
disassociating the first set of temperature alarm setpoints with the means for providing a temperature controlled environment when the sensed temperature of the temperature controlled environment is one of less than and at most equal to the transition temperature setpoint; and
associating the second set of temperature alarm setpoints with the means for providing a temperature controlled environment when the sensed temperature of the controlled environment is one of less than and at most equal to the transition temperature setpoint.

4. A method of automatically selecting temperature alarm setpoints for at least one of a cooler and a freezer, the at least one of the cooler and the freezer providing a temperature controlled environment, which comprises the steps of:
storing in memory at least two sets of temperature alarm setpoints, the at least two sets of temperature alarm setpoints including a first set of high and low temperature alarm setpoints for a cooler, and a second set of high and low temperature alarm setpoints for a freezer;
storing in memory a transition temperature setpoint;
sensing the temperature of the temperature controlled environment provided by the at least one of the cooler and the freezer thereby generating a sensed temperature;
comparing the sensed temperature of the temperature controlled environment with the transition temperature setpoint stored in memory;
selecting the first set of temperature alarm setpoints for a cooler when the sensed temperature of the temperature controlled environment is one of at least equal to and greater than the transition temperature setpoint stored in memory; and
selecting the second set of temperature alarm setpoints for a freezer when the sensed temperature of the temperature controlled environment is one of less than and at most equal to the transition temperature setpoint stored in memory.

5. A method as defined by claim 4, which further comprises the steps of:
pre-selecting the first set of temperature alarm setpoints for a cooler prior to comparing the sensed temperature of the temperature controlled environment with the transition temperature setpoint stored in memory to provide a pre-selection therefor; and
maintaining the pre-selection of the first set of temperature alarm setpoints for a cooler when the sensed temperature of the temperature controlled environment is one of at least equal to and greater than the transition temperature setpoint stored in memory.

6. A method as defined by claim 4, which further comprises the steps of:
pre-selecting the first set of temperature alarm setpoints for a cooler prior to comparing the sensed temperature of the temperature controlled environment with the transition temperature setpoint stored in memory to provide a pre-selection therefor;
maintaining the pre-selection of the first set of temperature alarm setpoints for a cooler when the sensed temperature of the temperature controlled environment is one of at least equal to and greater than the transition temperature setpoint stored in memory;
unselecting the first set of temperature alarm setpoints for a cooler when the sensed temperature of the temperature controlled environment is one of less than and at most equal to the transition temperature setpoint stored in memory; and
selecting the second set of temperature alarm setpoints for a freezer when the sensed temperature of the temperature controlled environment is one of less than and at most equal to the transition temperature stored in memory.

7. A method as defined by claim 4, wherein the set of high and low temperature alarm setpoints for a cooler includes a high temperature alarm setpoint corresponding to a temperature of about 45° Fahrenheit and a low temperature alarm setpoint corresponding to a temperature of about 30° Fahrenheit.

8. A method as defined by claim 4, wherein the set of high and low temperature alarm setpoints for a freezer includes a high temperature alarm setpoint corresponding to a temperature of about 10° Fahrenheit and a low temperature alarm setpoint corresponding to a temperature of about −20° Fahrenheit.

9. A method as defined by claim 4, wherein the transition temperature setpoint corresponds to a temperature of about 10° Fahrenheit.

10. A method of automatically selecting temperature alarm setpoints for at least one of a cooler and a freezer, the at least one of the cooler and the freezer providing a temperature controlled environment, which comprises the steps of:
transferring into a working memory high and low temperature alarm setpoints for the cooler stored in an electrically erasable memory;
sensing the temperature of the temperature controlled environment provided by the at least one of the cooler and the freezer thereby generating a sensed temperature;
transferring into the working memory a transition temperature setpoint from a program memory;
comparing the sensed temperature of the temperature controlled environment with the transition temperature setpoint;
if, in response to the comparing step, the sensed temperature of the temperature controlled environment is one of at least equal to and greater than the transition temperature setpoint, then maintaining in the working memory the high and low temperature alarm setpoints for the cooler; and
if, in response to the comparing step, the sensed temperature of the temperature controlled environment is one of less than and at most equal to the transition temperature setpoint, then transferring the working memory high and low temperature alarm setpoints for the freezer from the electrically erasable memory and overwriting the high and low temperature alarm setpoints for the cooler with the high and low temperature alarm setpoints for the freezer.

11. A method as defined by claim 10, which further comprises the step of:

after the conditional step of overwriting the high and low temperature alarm setpoints for the cooler with the high and low temperature alarm setpoints for the freezer, maintaining the selection of the temperature alarm setpoints for the freezer if the sensed temperature of the temperature controlled environment is one of at least equal to and greater than the transition temperature setpoint.

12. A system for automatically associating one set of at least two sets of temperature alarm setpoints with means for providing a temperature controlled environment, the at least two sets of temperature alarm setpoints including a first set having a high temperature alarm setpoint and a low temperature alarm setpoint, and a second set having a high temperature alarm setpoint and a low temperature alarm setpoint, the high temperature alarm setpoint of the first set being greater than the high temperature alarm setpoint of the second set, and the low temperature alarm setpoint of the first set being greater than the low temperature alarm setpoint of the second, which comprises:

a sensor for sensing the temperature of the temperature controlled environment to generate a sensed temperature; and a comparator operatively coupled to the sensor for comparing the sensed temperature of the temperature controlled environment with a transition temperature setpoint;

wherein the first set of temperature alarm setpoints is associated with the means for providing a temperature controlled environment when the sensed temperature of the controlled environment is one of at least equal to and greater than the transition temperature setpoint.

13. A system as defined by claim 12, wherein:

the first set of temperature alarm setpoints is pre-associated with the means for providing a temperature controlled environment prior to comparing the sensed temperature of the temperature controlled environment with the transition temperature setpoint to provide a pre-association therewith; and the pre-association of the first set of temperature alarm setpoints is maintained with the means for providing a temperature controlled environment when the sensed temperature of the temperature controlled environment is one of at least equal to and greater than the transition temperature setpoint.

14. A system as defined by claim 12, wherein:

the first set of temperature alarm setpoints is pre-associated with the means for providing a temperature controlled environment prior to comparing the sensed temperature of the controlled environment with the transition temperature setpoint to provide a pre-association therewith;

the pre-association of the first set of temperature alarm setpoints is maintained with the means for providing a temperature controlled environment when the sensed temperature of the temperature controlled environment is one of at least equal to and greater than the transition temperature setpoint;

the first set of temperature alarm setpoints is disassociated with the means for providing a temperature controlled environment when the sensed temperature of the temperature controlled environment is one of less than and at most equal to the transition temperature setpoint; and the second set of temperature alarm setpoints is associated with the means for providing a temperature controlled environment when the sensed temperature of the controlled environment is one of less than and at most equal to the transition temperature setpoint.

15. A system for automatically selecting temperature alarm setpoints for at least one of a cooler and a freezer, the at least one of the cooler and the freezer providing a temperature controlled environment, which comprises:

storage means for storing therein a transition temperature setpoint and at least two sets of temperature alarm setpoints, the at least two sets of temperature alarm setpoints including a first set of high and low temperature alarm setpoints for a cooler, and a second set of high and low temperature alarm setpoints for a freezer;

a sensor for sensing for sensing the temperature of the temperature controlled environment provided by the at least one of the cooler and the freezer thereby generating a sensed temperature;

a comparator operatively coupled to the sensor and to the storage means for comparing the sensed temperature of the temperature controlled environment with the transition temperature setpoint stored in the storage means; and means operatively coupled to the comparator for selecting one of the at least two sets of temperature alarm setpoints;

wherein the first set of temperature alarm setpoints for a cooler is selected by the selecting means when the sensed temperature of the temperature controlled environment is one of at least equal to and greater than the transition temperature setpoint stored in the storage means; and wherein the second set of temperature alarm setpoints for a freezer is selected by the selecting means when the sensed temperature of the temperature controlled environment is one of less than and at most equal to the transition temperature setpoint stored in the storage means.

16. A system as defined by claim 15, wherein:

the first set of temperature alarm setpoints for a cooler is pre-selected prior to comparing the sensed temperature of the temperature controlled environment with the transition temperature setpoint stored in the storage means to provide a pre-selection therefor; and the pre-selection of the first set of temperature alarm setpoints for a cooler is maintained when the sensed temperature of the temperature controlled environment is one of at least equal to and greater than the transition temperature setpoint stored in the storage means.

17. A system as defined by claim 15, wherein:

the first set of temperature alarm setpoints for a cooler is pre-selected prior to comparing the sensed temperature of the temperature controlled environment with the transition temperature setpoint stored in the storage means to provide a pre-selection therefor;

the pre-selection of the first set of temperature alarm setpoints for a cooler is maintained when the sensed temperature of the temperature controlled environment is one of at least equal to and greater than the transition temperature setpoint stored in the storage means;

the first set of temperature alarm setpoints for a cooler is unselected when the sensed temperature of the temperature controlled environment is one of less than and at most equal to the transition temperature setpoint stored in the storage means; and the second set of temperature alarm setpoints for a freezer is selected when the sensed temperature of the temperature controlled environment is one of less than and at most equal to the transition temperature stored in the storage means.

18. A system as defined by claim 15, wherein the set of high and low temperature alarm setpoints for a cooler includes a high temperature alarm setpoint corresponding to a temperature of about 45° Fahrenheit and a low temperature alarm setpoint corresponding to a temperature of about 30° Fahrenheit.

19. A system as defined by claim 15, wherein the set of high and low temperature alarm setpoints for a freezer includes a high temperature alarm setpoint corresponding to a temperature of about 10° Fahrenheit and a low temperature alarm setpoint corresponding to a temperature of about −20° Fahrenheit.

20. A system as defined by claim 15, wherein the transition temperature setpoint corresponds to a temperature of about 10° Fahrenheit.

21. A system for automatically selecting temperature alarm setpoints for at least one of a cooler and a freezer, the at least one of the cooler and the freezer providing a temperature controlled environment, comprising:
an electrically erasable memory in which high and low temperature alarm setpoints for the cooler and for the freezer are stored;
a program memory in which a transition temperature setpoint is stored;
a working memory operatively coupled to the electrically erasable memory and to the program memory into which the high and low temperature alarm setpoints for the cooler are transferred from the electrically erasable memory and into which the transition temperature setpoint is transferred from the program memory;
a sensor for sensing the temperature of the temperature controlled environment provided by the at least one of the cooler and the freezer thereby generating a sensed temperature; and
a comparator operatively coupled to the sensor for comparing the sensed temperature of the temperature controlled environment with the transition temperature setpoint and generating an output in response thereto;
wherein if, in response to the output of the comparator, the sensed temperature of the temperature controlled environment is one of at least equal to and greater than the transition temperature setpoint, then the high and low temperature alarm setpoints for the cooler are maintained in the working memory; and
if, in response to the output of the comparator, the sensed temperature of the temperature controlled environment is one of less than and at most equal to the transition temperature setpoint, then the high and low temperature alarm setpoints for the freezer are transferred from the electrically erasable memory to the working memory and the high and low temperature alarm setpoints for the cooler are overwritten with the high and low temperature alarm setpoints for the freezer.

22. A system as defined by claim 21, wherein:
after the high and low temperature alarm setpoints for the cooler are overwritten with the high and low temperature alarm setpoints for the freezer, the selection of the temperature alarm setpoints for the freezer is maintained in the working memory if the sensed temperature of the temperature controlled environment is one of at least equal to and greater than the transition temperature setpoint.

23. A method of automatically associating one of at least two temperature alarm setpoints with means for providing a temperature controlled environment, which comprises the steps of:
sensing the temperature of the temperature controlled environment to generate a sensed temperature;
comparing the sensed temperature of the temperature controlled environment with a transition temperature setpoint; and
associating one of the at least two temperature alarm setpoints with the means for providing a temperature controlled environment when the sensed temperature of the controlled environment is one of at least equal to and greater than the transition temperature setpoint.

24. A method of automatically associating one of at least a first temperature alarm setpoint and a second temperature alarm setpoint with means for providing a temperature controlled environment, which comprises the steps of:
sensing the temperature of the temperature controlled environment to generate a sensed temperature;
comparing the sensed temperature of the temperature controlled environment with a transition temperature setpoint; and
associating the first temperature alarm setpoint with the means for providing a temperature controlled environment when the sensed temperature of the controlled environment is one of at least equal to and greater than the transition temperature setpoint.

25. A method defined by claim 24, wherein the first temperature alarm setpoint is greater than the second temperature alarm setpoint.

26. A method as defined by claim 24, which further comprises the steps of:
pre-associating the first temperature alarm setpoint with the means for providing a temperature controlled environment prior to comparing the sensed temperature of the controlled environment with the transition temperature setpoint to provide a pre-association therewith;
maintaining the pre-association of the first temperature alarm setpoint with the means for providing a temperature controlled environment when the sensed temperature of the temperature controlled environment is one of at least equal to and greater than the transition temperature setpoint;
disassociating the first temperature alarm setpoint with the means for providing a temperature controlled environment when the sensed temperature of the temperature controlled environment is one of less than and at most equal to the transition temperature setpoint; and
associating the second temperature alarm setpoint with the means for providing a temperature controlled environment when the sensed temperature of the controlled environment is one of less than and at most equal to the transition temperature setpoint.

27. A system for automatically associating one of at least two temperature alarm setpoints with means for providing a temperature controlled environment, the system comprising:
a sensor for sensing the temperature of the temperature controlled environment to generate a sensed temperature; and
a comparator operatively coupled to the sensor for comparing the sensed temperature of the temperature controlled environment with a transition temperature setpoint;
wherein one of the temperature alarm setpoints is associated with the means for providing a temperature controlled environment when the sensed temperature of the controlled environment is one of at least equal to and greater than the transition temperature setpoint.

28. A system for automatically associating one of at least a first temperature alarm setpoint and a second temperature alarm setpoint with means for providing a temperature controlled environment, the system comprising:
   a sensor for sensing the temperature of the temperature controlled environment to generate a sensed temperature; and
   a comparator operatively coupled to the sensor for comparing the sensed temperature of the temperature controlled environment with a transition temperature setpoint; wherein
   the first temperature alarm setpoint is associated with the means for providing a temperature controlled environment when the sensed temperature of the controlled environment is one of at least equal to and greater than the transition temperature setpoint.

29. A system as defined by claim 28, wherein the first temperature alarm setpoint is greater than the second temperature alarm setpoint.

30. A system as defined by claim 28, wherein:
   the first temperature alarm setpoint is pre-associated with the means for providing a temperature controlled environment prior to comparing the sensed temperature of the controlled environment with the transition temperature setpoint to provide a pre-association therewith;
   the pre-association of the first temperature alarm setpoint with the means for providing a temperature controlled environment is maintained when the sensed temperature of the temperature controlled environment is one of at least equal to and greater than the transition temperature setpoint;
   the first temperature alarm setpoint is disassociated with the means for providing a temperature controlled environment when the sensed temperature of the temperature controlled environment is one of less than and at most equal to the transition temperature setpoint; and
   the second temperature alarm setpoint is associated with the means for providing a temperature controlled environment when the sensed temperature of the controlled environment is one of less than and at most equal to the transition temperature setpoint.

* * * * *